(12) United States Patent
Takahashi et al.

(10) Patent No.: US 10,658,124 B2
(45) Date of Patent: May 19, 2020

(54) ELECTROCHEMICAL DEVICE

(71) Applicant: TAIYO YUDEN CO., LTD., Chuo-ku, Tokyo (JP)

(72) Inventors: Hiroki Takahashi, Takasaki (JP); Koji Kano, Takasaki (JP); Takatoshi Nagase, Takasaki (JP); Katsunori Yokoshima, Takasaki (JP); Shinji Ishii, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 101 days.

(21) Appl. No.: 15/783,985

(22) Filed: Oct. 13, 2017

(65) Prior Publication Data

US 2018/0108494 A1  Apr. 19, 2018

(30) Foreign Application Priority Data

Oct. 18, 2016  (JP) .................................. 2016-204447

(51) Int. Cl.
  *H01G 11/06* (2013.01)
  *H01G 11/26* (2013.01)
  (Continued)

(52) U.S. Cl.
  CPC ............. *H01G 11/06* (2013.01); *H01G 11/26* (2013.01); *H01G 11/28* (2013.01); *H01G 11/70* (2013.01);
  (Continued)

(58) Field of Classification Search
  None
  See application file for complete search history.

(56) References Cited

U.S. PATENT DOCUMENTS

| 2010/0285353 A1* | 11/2010 | Katayama | ............... H01M 2/26 |
| | | | 429/185 |
| 2014/0199581 A1* | 7/2014 | Ryu | .................. H01M 10/0413 |
| | | | 429/161 |
| 2015/0248971 A1* | 9/2015 | Isii | ......................... H01G 11/06 |
| | | | 361/502 |

FOREIGN PATENT DOCUMENTS

| CN | 101789529 A | 7/2010 |
| CN | 102027619 A | 4/2011 |

(Continued)

OTHER PUBLICATIONS

A First Office Action issued by the State Intellectual Property Office of China dated Dec. 3, 2018 for Chinese counterpart application No. 201710971211.3 (7 pages).

*Primary Examiner* — Daniel S Gatewood
(74) *Attorney, Agent, or Firm* — Law Office of Katsuhiro Arai (57) ABSTRACT

In an embodiment, an electrochemical device includes a winding structure which has a negative electrode, a positive electrode, and separators stacked and wound together; a negative-electrode terminal; a positive-electrode terminal; a first protective tape which covers the negative-electrode terminal and a negative-electrode active material layer; a second protective tape which covers the positive-electrode terminal and a positive-electrode active material layer; and electrolyte, wherein the positive-electrode terminal is separated from the negative-electrode terminal by a first distance. The width corresponding to the sum of a first width of the first protective tape along a winding direction of the winding structure, and a second width of the second protective tape along the winding direction, is smaller than a value obtained by multiplying the first distance by pi.

14 Claims, 8 Drawing Sheets

(51) Int. Cl.
*H01M 10/052* (2010.01)
*H01M 10/04* (2006.01)
*H01G 11/28* (2013.01)
*H01G 11/70* (2013.01)
*H01G 11/86* (2013.01)
*H01M 2/16* (2006.01)
*H01M 10/0587* (2010.01)
*H01G 11/52* (2013.01)
*H01G 11/82* (2013.01)

(52) U.S. Cl.
CPC .......... *H01G 11/86* (2013.01); *H01M 2/1673* (2013.01); *H01M 10/0431* (2013.01); *H01M 10/052* (2013.01); *H01M 10/0587* (2013.01); *H01G 11/52* (2013.01); *H01G 11/82* (2013.01); *Y02E 60/13* (2013.01)

(56) References Cited

FOREIGN PATENT DOCUMENTS

| | | | |
|---|---|---|---|
| CN | 103413975 A | | 11/2013 |
| JP | 2004303590 A | | 10/2004 |
| JP | 2009245650 A | | 10/2009 |
| JP | 4565810 B2 | | 10/2010 |
| JP | 2012114161 A | * | 6/2012 |
| JP | 2012114161 A | | 6/2012 |

* cited by examiner

ELECTROCHEMICAL DEVICE

BACKGROUND

Field of the Invention

The present invention relates to an electrochemical device having current collectors, active materials, and electrode terminals.

Description of the Related Art

Representative examples of electrochemical devices include lithium ion capacitors. Some lithium ion capacitors are constituted by a cylindrical housing case that houses an electric storage element in which a negative electrode, a positive electrode, separators insulating the negative electrode and the positive electrode, an electrode terminal connected to the negative electrode, and an electrode terminal connected to the positive electrode are wound.

In such lithium ion capacitor, lithium ions are pre-doped into a negative electrode before use. The pre-doping involves, for example, providing a lithium ion supply source outside the negative-electrode terminal and positive-electrode terminal, and immersing the electric storage element in electrolyte inside the housing case. Then, as lithium ions elute into the electrolyte, those lithium ions are doped into the negative electrode of the electric storage element.

Also with lithium ion capacitors, the negative-electrode terminal is sometimes covered with a protective tape in order to prevent direct contact between the separators and the negative-electrode terminal (or positive-electrode terminal), or to suppress lithium deposition onto the negative-electrode terminal at the time of pre-doping (refer to Patent Literature 1, for example).

BACKGROUND ART LITERATURES

[Patent Literature 1] Japanese Patent Laid-open No. 2012-114161

SUMMARY

As the electrochemical device becomes much smaller, however, the protective tape affects pre-doping more. For example, lithium ions are more likely shielded by the protective tape at the time of pre-doping, which gives rise to a possibility that lithium ions are not doped uniformly into the negative electrode after pre-doping.

In light of the aforementioned situation, an object of the present invention is to provide an electrochemical device in which lithium ions are uniformly doped into a negative electrode after pre-doping, even when the electrochemical device becomes much smaller.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electrochemical device pertaining to an embodiment of the present invention comprises a winding structure, a negative-electrode terminal, a positive-electrode terminal, a first protective tape, a second protective tape, and electrolyte.

The winding structure has a negative electrode, a positive electrode, and separators. The negative electrode has a negative-electrode collector, and a negative-electrode active material layer provided on a principle face of the negative-electrode collector. The positive electrode has a positive-electrode collector, and a positive-electrode active material layer provided on a principle face of the positive-electrode collector. The separators insulate the negative electrode and the positive electrode. The negative electrode, the positive electrode, and the separators are stacked and wound together, with the negative electrode and the positive electrode separated by the separators.

The negative-electrode terminal is electrically connected to the negative-electrode collector. The negative-electrode terminal extends in the winding structure along a center axis of winding of the winding structure. The negative-electrode terminal projects from the winding structure.

The positive-electrode terminal is electrically connected to the positive-electrode collector. The positive-electrode terminal extends in the winding structure along the center axis of winding. The positive-electrode terminal projects from the winding structure. The positive-electrode terminal is separated from the negative-electrode terminal by a first distance. The first distance is defined as a distance or an average distance, if applicable, in a straight line between a center of the positive-electrode terminal and the a center of the negative-electrode terminal on a plane passing through the winding structure in a direction orthogonal to the center axis of winding of the winding structure.

The first protective tape covers the negative-electrode terminal and the negative-electrode active material layer.

The second protective tape covers the positive-electrode terminal and the positive-electrode active material layer.

The electrolyte immerses the positive electrode, the negative electrode, and the separators.

The width corresponding to the sum of a first width of the first protective tape along a winding direction of the winding structure, and a second width of the second protective tape along the winding direction, is smaller than a value obtained by multiplying the first distance by pi ($\pi$). Each of the first and second widths is defined as a width or an average width, if applicable, measured along the winding direction/surface on a plane passing through the winding structure and the corresponding protective tape in a direction orthogonal to the center axis of winding of the winding structure.

According to the electrochemical device described above, lithium ions are less likely shielded by the first protective tape or second protective tape at the time of pre-doping. As a result, lithium ions are more uniformly doped into the negative electrode.

With the aforementioned electrochemical device, lithium ions may be pre-doped into the negative-electrode active material layer.

This way, lithium ions are more uniformly doped into the negative electrode through pre-doping.

With the aforementioned electrochemical device, the first protective tape may not overlap the second protective tape in the direction from the center axis of winding toward an outer periphery of the winding structure.

This way, lithium ions pass between the first protective tape and the second protective tape during pre-doping, and are thus doped into the negative electrode more uniformly.

With the aforementioned electrochemical device, the first distance may be 8 mm or less.

This means that lithium ions are less likely shielded by the first protective tape or the second protective tape during pre-doping, even when the first distance of the electrochemical device is 8 mm or less, and are thus doped into the negative electrode more uniformly.

With the aforementioned electrochemical device, an outer diameter of the winding structure may be 30 mm or less.

This means that lithium ions are less likely shielded by the first protective tape or the second protective tape during pre-doping, even when the outer diameter of the winding structure of the electrochemical device is 30 mm or less, and are thus doped into the negative electrode more uniformly.

With the aforementioned electrochemical device, the first width equals X % of the aforementioned value (X≥12.0), while the second width is smaller than (100−X)%.

According to the protective tapes meeting these ranges of values, lithium ions are less likely shielded by the first protective tape or the second protective tape during pre-doping, and are thus doped into the negative electrode more uniformly.

As described above, according to the present invention, lithium ions are more uniformly doped into the negative electrode after pre-doping, even when the electrochemical device becomes smaller.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

100 - - - Electrochemical device
110A, 110B, 210A, 210B - - - Electric storage element
111, 211 - - - Winding structure
112 - - - Winding core
115, 215 - - - Circle
120, 220 - - - Housing case
130 - - - Negative electrode
131, 231 - - - Negative-electrode terminal
131$w$ - - - Width
131$p$ - - - Pin member
132 - - - Negative-electrode collector
132$a$, 132$b$ - - - Principle face
133 - - - Negative-electrode active material layer
140 - - - Positive electrode
141, 241 - - - Positive-electrode terminal
141$w$ - - - Width
142 - - - Positive-electrode collector
142$a$, 142$b$ - - - Principle face
143 - - - Positive-electrode active material layer
150, 150$a$, 150$b$ - - - Separator
161, 162, 171, 172, 261, 271 - - - Protective tape
161$w$, 162$w$, 171$w$, 172$w$, 261$w$, 271$w$ - - - Width
180 - - - Lithium electrode
181, 281 - - - Metal foil
181$a$, 181$b$ - - - Principle face
183, 283 - - - Lithium layer
283H - - - Area with high concentration
283L - - - Area with low concentration
C1 - - - Center axis of winding

DETAILED DESCRIPTION OF EMBODIMENTS

An embodiment of the present invention is explained below by referring to the drawings. XYZ-axis coordinates may be applied in each drawing.

[Overview of Electrochemical Device]

An overview of an electrochemical device 100 pertaining to this embodiment is explained below. The electrochemical device illustrated in this embodiment is a lithium ion capacitor. Details of an electric storage element 110A contained in the electrochemical device 100 are described later.

Figure 1:
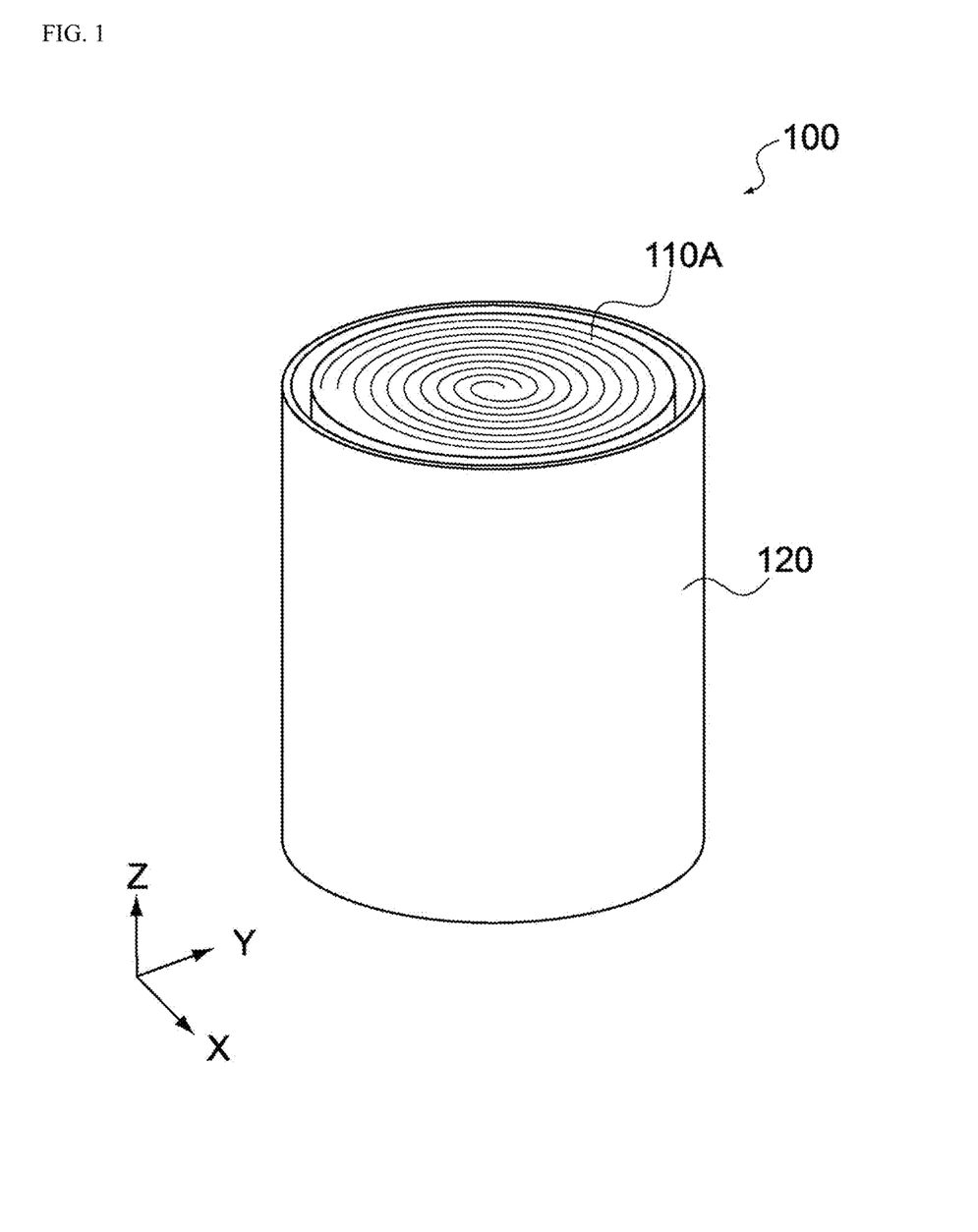
FIG. 1 is a schematic oblique view showing the appearance of the electrochemical device 100 pertaining to this embodiment.

FIG. 1 is a schematic oblique view showing the appearance of the electrochemical device 100 pertaining to this embodiment.

With the electrochemical device 100 shown in FIG. 1, the electric storage element 110A is housed in a housing case 120. In addition to the electric storage element 110A, the housing case 120 is also filled with electrolyte. With the electrochemical device 100, the electric storage element 110A is immersed in the electrolyte. A lid (not illustrated) is provided on the electric storage element 110A, and the electrolyte is sealed by the housing case 120 and the lid.

The electrochemical device 100 in which the electric storage element 110A is immersed in the electrolyte has completed pre-doping. For example, the electric storage element 110A has a lithium ion supply source before it is immersed in the electrolyte (described later). Then, when the electric storage element 110A is immersed in the electrolyte, lithium ions elute from the lithium ion supply source into the electrolyte, and those lithium ions are doped into the negative electrode of the electric storage element 110A.

[Constitution of Electric Storage Element]

Figure 2A:
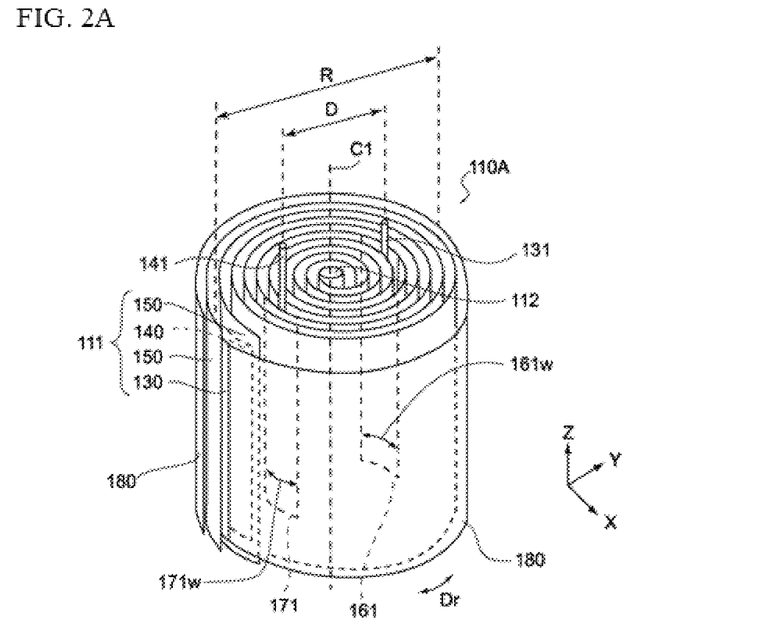
FIG. 2A is a schematic oblique view showing the electric storage element 110A pertaining to this embodiment.
Figure 2B:
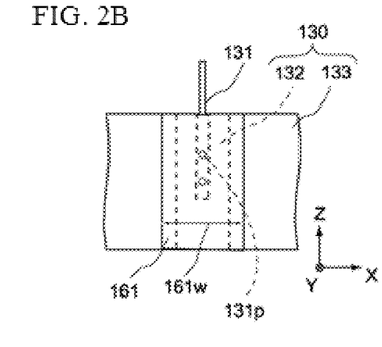
FIG. 2B is a schematic side view showing the negative electrode 130, the negative-electrode terminal 131, and the protective tape 161 pertaining to this embodiment.
Figure 2C:
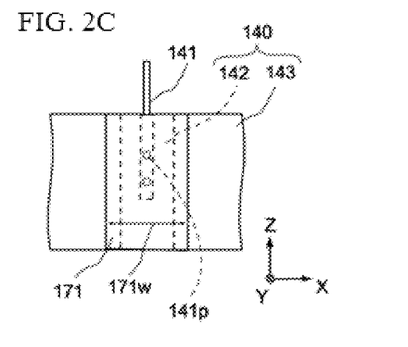
FIG. 2C is a schematic side view showing the positive electrode 140, the positive-electrode terminal 141, and the protective tape 171 pertaining to this embodiment.

FIG. 2A is a schematic oblique view showing the electric storage element 110A pertaining to this embodiment. FIG. 2B is a schematic side view showing a negative electrode 130, a negative-electrode terminal 131, and a protective tape 161 pertaining to this embodiment. FIG. 2C is a schematic side view showing a positive electrode 140, a positive-electrode terminal 141, and a protective tape 171 pertaining to this embodiment.

FIGS. 2A, 2B, and 2C show the electric storage element 110A in a state before pre-doping, where the electric storage element 110A is not yet immersed in the electrolyte.

As shown in FIG. 2A, the electric storage element 110A has the negative electrode 130, the positive electrode 140, the negative-electrode terminal 131, the positive-electrode terminal 141, a winding core 112, separators 150, and a lithium electrode 180. The electric storage element 110A illustrated in FIG. 2A is an electric storage element before pre-doping. The negative electrode 130 is an electrode capable of occluding lithium ions. The positive electrode 140 is a polarizable electrode. With such electric storage element, preferably lithium ions are more uniformly doped into the negative electrode after pre-doping.

In this embodiment, the direction in which the winding core 112 extends represents a Z-axis direction. An X-axis direction represents a direction orthogonal to the Z-axis direction. A Y-axis direction represents a direction orthogonal to the X-axis direction and Z-axis direction. The direction in which the winding core 112 extends (the direction parallel with a center axis of winding C1) is also the direction in which the negative-electrode terminal 131 and the positive-electrode terminal 141 extend. Also, with the electric storage element 110A, the direction from the center axis of winding C1 toward an outer periphery of the electric storage element 110A represents an outer direction, and the opposite direction of the outer direction represents an inner direction. This embodiment also includes in its scope those structures where no winding core 112 is provided in the electric storage element 110A.

The negative electrode 130, the positive electrode 140, and the separators 150 are stacked from the winding core 112 toward the outer side. The separators 150 separate the positive electrode 140 and the negative electrode 130. The separators 150 insulate the negative electrode 130 and the positive electrode 140. The negative electrode 130 and the positive electrode 140 are both wound around the winding core 112. The separators 150 are placed between the negative electrode 130 and the positive electrode 140 and wound around the winding core 112. In this embodiment, the structure that includes the negative electrode 130, the positive electrode 140, and the separators 150 is referred to as a winding structure 111. An outer diameter R of the winding structure 111 is 30 mm or less, for example. The outer diameter R of the winding structure 111 may be greater than 30 mm.

For example, FIG. 2B shows the negative electrode 130, the negative-electrode terminal 131, and the protective tape 161 in a stage before the winding structure 111 is wound. The negative electrode 130 has a negative-electrode collector 132 and a negative-electrode active material layer 133. The negative-electrode terminal 131 is electrically connected to the negative-electrode collector 132 of the negative electrode 130. The negative-electrode terminal 131 is joined to the negative-electrode collector 132 on which the negative-electrode active material layer 133 is not provided, by means of needle-clinching using pin members 131$p$, for example. The negative-electrode terminal 131 extends in the winding structure 111 along the center axis of winding C1 of the winding structure 111. The negative-electrode terminal 131 projects from the winding structure 111.

The protective tape 161 (a first protective tape) covers the negative-electrode terminal 131. The protective tape 161 covers the negative-electrode terminal 131 and the negative-electrode active material layer 133. The protective tape 161 has a width 161$w$ (a first width) along a winding direction Dr. The winding direction Dr is the direction in which the negative electrode 130, the positive electrode 140, and the separators 150 are wound around the center axis of winding C1.

Also, FIG. 2C shows the positive electrode 140, the positive-electrode terminal 141, and the protective tape 171 in a stage before the winding structure 111 is wound. The positive electrode 140 has a positive-electrode collector 142 and a positive-electrode active material layer 143. The positive-electrode terminal 141 is electrically connected to the positive-electrode collector 142 of the positive electrode 140. The positive-electrode terminal 141 is joined to the positive-electrode collector 142 on which the positive-electrode active material layer 143 is not provided, by means of needle-clinching using pin members 141$p$, for example. The positive-electrode terminal 141 extends in the winding structure 111 along the center axis of winding C1. The positive-electrode terminal 141 projects from the winding structure 111. For example, the positive-electrode terminal 141 projects from the winding structure 111 in the same direction as the negative-electrode terminal 131.

The protective tape 171 (a second protective tape) covers the positive-electrode terminal 141. The protective tape 171 covers the positive-electrode terminal 141 and the positive-electrode active material layer 143. The protective tape 171 has a width 171$w$ (a second width) along the winding direction Dr.

The negative-electrode terminal 131 and the positive-electrode terminal 141 each contain at least one of copper, aluminum, iron, etc. for example. The negative-electrode terminal 131 is a copper terminal, for example. The positive-electrode terminal 141 is an aluminum terminal, for example.

As shown in FIG. 2A, the positive-electrode terminal 141 is separated from the negative-electrode terminal 131 by a distance D (a first distance). The distance D is defined by the distance between the center of the positive-electrode terminal 141 and the center of the negative-electrode terminal 131 in the X-Y plane. The distance D is 8 mm or less, for example. The distance D may be greater than 8 mm.

With the electric storage element 110A, the width corresponding to the sum of the width 161$w$ of the protective tape 161 and the width 171$w$ of the protective tape 171 is smaller than a value obtained by multiplying the distance D by pi $\pi$ ((Width 161$w$+Width 171$w$)<D×$\pi$ - - - (1)). D×$\pi$ is equivalent to the circumference of a circle of which the diameter is D. The widths 161$w$ and 171$w$ are each variable. However, the widths 161$w$ and 171$w$ satisfy the relationship of Expression (1) above. Also, the width 161$w$ may be different from the width 171$w$. For example, the width 161$w$ equals X % of the value of (D×$\pi$) (X≥12.0), while the width 171$w$ is smaller than (100−X)%. Furthermore, the protective tape 161 does not overlap the protective tape 171 in the direction from the center axis of winding C1 toward the outer periphery of the winding structure 111.

Also, in the example of FIG. 2A, the center of the protective tape 171, the winding core 112 (the center axis of winding C1), and the center of the protective tape 161 are arranged in this order along a single line. Furthermore, in the example of FIG. 2A, the width 161w is the same as the width 171w. It should be noted that the center of the protective tape 171, the winding core 112 (the center axis of winding C1), and the center of the protective tape 161 need not be arranged along a single line. For example, the angle formed by the line drawn from the center axis of winding C1 to the center of the protective tape 171, and the line drawn from the center axis of winding C1 to the center of the protective tape 161, may be smaller than 180 degrees.

The lithium electrode 180 is electrically connected to the negative electrode 130. The lithium electrode 180 is placed on the outer side of the negative-electrode terminal 131 and the positive-electrode terminal 141. In the example of FIG. 2A, the winding structure 111 is surrounded by the lithium electrode 180. This lithium electrode 180 has a metal foil and a lithium layer, for example. The position at which the lithium electrode 180 is placed is not limited to the one in the example of FIG. 2A. Also, the positions at which the separators 150 are placed are not limited to the ones in the example of FIG. 2. For example, while the lithium electrode 180 is exposed from the separators 150 in the example of FIG. 2A, the lithium electrode 180 may be surrounded by the separators 150.

A cross-sectional structure of the electric storage element 110A, obtained by cutting it along the X-Y plane, is explained in greater detail.

Figure 3:
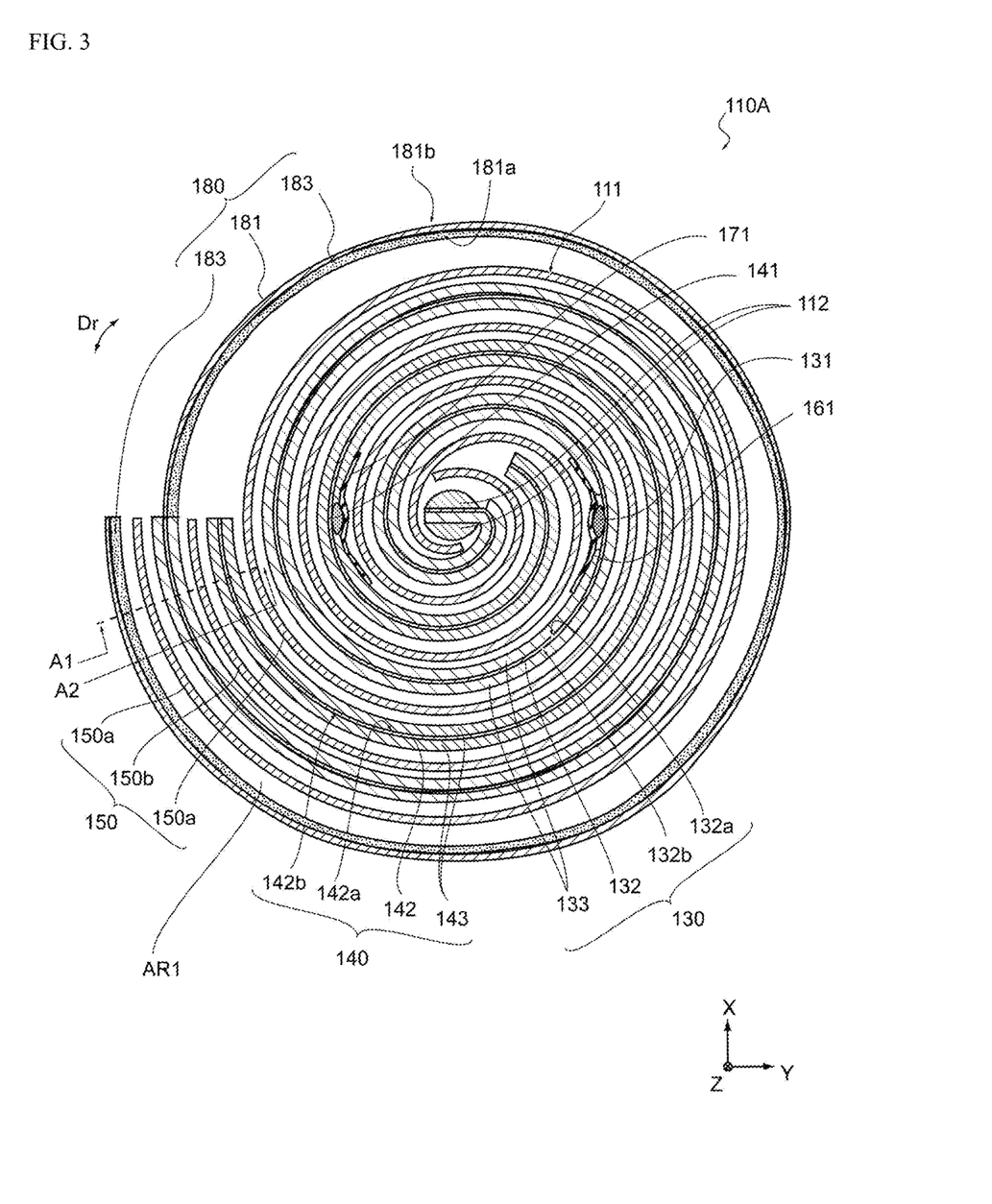
FIG. 3 is a schematic cross-sectional view, along the X-Y plane, of the electric storage element 110A pertaining to this embodiment.

FIG. 3 is a schematic cross-sectional view, along the X-Y plane, of the electric storage element 110A pertaining to this embodiment.

FIG. 3 shows how the cross-section of the electric storage element 110A, obtained by cutting it along the X-Y plane, looks when the electric storage element 110A is viewed from below.

Figure 4A:
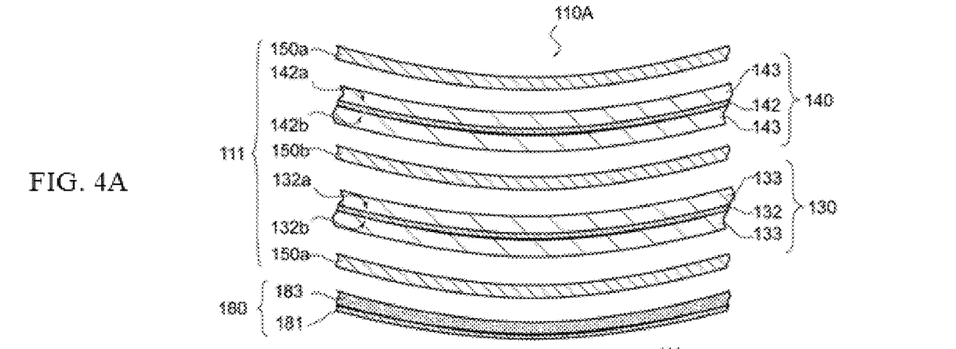
FIG. 4A is a schematic cross-sectional view of FIG. 3 along the A1-A2 line.
Figure 4B:
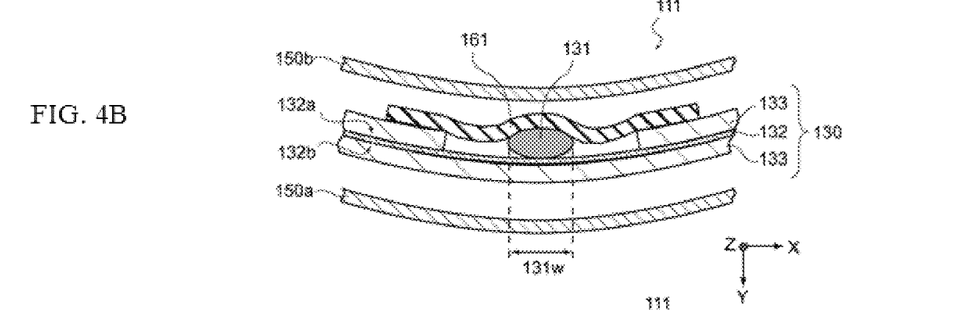
FIG. 4B is a schematic cross-sectional view showing an enlarged view around the negative-electrode terminal 131 illustrated in FIG. 3.
Figure 4C:
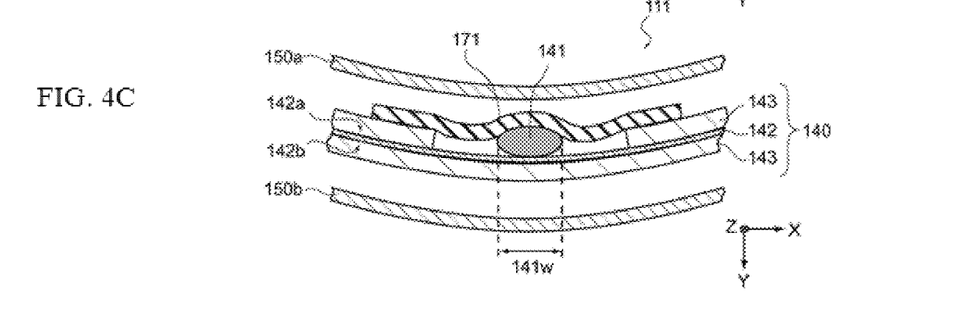
FIG. 4C is a schematic cross-sectional view showing an enlarged view around the positive-electrode terminal 141 illustrated in FIG. 3.

FIG. 4A is a schematic cross-sectional view of FIG. 3 along the A1-A2 line. FIG. 4B is a schematic cross-sectional view showing an enlarged view around the negative-electrode terminal 131 illustrated in FIG. 3. FIG. 4C is a schematic cross-sectional view showing an enlarged view around the positive-electrode terminal 141 illustrated in FIG. 3.

With the negative electrode 130, the negative-electrode active material layer 133 is provided on principle faces 132a and 132b of the negative-electrode collector 132. A part of the negative-electrode active material layer 133 is detached from the principle face 132a of the negative-electrode collector 132. The negative-electrode terminal 131 is connected to this detached part of the negative-electrode collector 132.

The negative-electrode terminal 131 and the negative-electrode active material layer 133 around the negative-electrode terminal 131 are covered by the protective tape 161. This way, the negative-electrode collector 132 is sealed by the protective tape 161 where the negative-electrode collector 132 is exposed because the negative-electrode active material layer 133 is detached.

The protective tape 161 faces the winding core 112 across the negative electrode 130, the positive electrode 140, and the separators 150. If the negative-electrode terminal 131 is not covered by the protective tape 161 during pre-doping, lithium may preferentially deposit onto the negative-electrode terminal 131. For this reason, preferably the negative-electrode terminal 131 is covered by the protective tape 161 so that the negative-electrode terminal 131 is shielded from the electrolyte.

With the positive electrode 140, the positive-electrode active material layer 143 is provided on principle faces 142a, 142b of the positive-electrode collector 142. The positive-electrode terminal 141 is electrically connected to the positive-electrode collector 142. For example, a part of the positive-electrode active material layer 143 is detached from the principle face 142a of the positive-electrode collector 142. The positive-electrode terminal 141 is connected to this detached part of the positive-electrode collector 142.

The positive-electrode terminal 141 and the positive-electrode active material layer 143 around the positive-electrode terminal 141 are covered by the protective tape 171. The protective tape 171 faces the winding core 112 across the negative electrode 130, the positive electrode 140, and the separators 150.

A width 131w of the negative-electrode terminal 131 is 2 mm or more, so as to ensure stable machining or adequate mechanical strength for the negative-electrode terminal 131. Similarly, a width 141w of the positive-electrode terminal 141 is 2 mm or more, so as to ensure stable machining or adequate mechanical strength for the positive-electrode terminal 141. Also, the width 161w of the protective tape 161 covering the negative-electrode terminal 131 is 3 mm or more. The width 171w of the protective tape 171 covering the positive-electrode terminal 141 is 3 mm or more. However, the sum of the widths 161w and 171w satisfies Expression (1) above.

The separators 150 include a separator 150a and a separator 150b. The separators 150a and 150b insulate the negative electrode 130 and the positive electrode 140. The separators 150a and 150b separate the negative electrode 130 and the positive electrode 140, while letting the ions contained in the electrolyte pass through the separators 150a and 150b. Also, the separators 150a and 150b may constitute one continuous separator.

With the electric storage element 110A in which the negative electrode 130, the positive electrode 140, and the separators 150 are wound, the principle face 132a of the negative-electrode collector 132 and the principle face 142a of the positive-electrode collector 142 constitute the inner faces of winding. Also, the principle face 132b of the negative-electrode collector 132 and the principle face 142b of the positive-electrode collector 142 constitute the outer faces of winding. In the examples of FIGS. 3, 4B and 4C, the protective tapes 161 and 171 are placed on the inner side of winding.

The lithium electrode 180 is placed on the outer side of the negative-electrode terminal 131 and the positive-electrode terminal 141. With the winding structure 111 illustrated in FIG. 3, the electrode on the outermost side of winding (an outermost periphery) is the negative electrode 130, and the lithium electrode 180 is connected to the negative-electrode collector 132 on this outermost side of winding. The lithium electrode 180 is placed in a manner surrounding the winding structure 111, for example. The lithium electrode 180 has a metal foil 181 and a lithium layer 183. The metal foil 181 is a copper foil, for example. The lithium layer 183 is a lithium foil, for example. The quantity of the lithium layer 183 is adjusted to a level at which lithium ions can be doped into the negative-electrode active material layer 133 at the time of lithium ion pre-doping. The lithium layer 183 may be provided over the entire surface of the metal foil 181, or it may be provided selectively on the metal foil 181.

The metal foil 181 is electrically connected to the negative-electrode collector 132. For example, the metal foil 181 is joined to the negative-electrode collector 132 by means of needle-clinching, welding, etc. The metal foil 181 is placed on the outer side of the winding structure 111 in a manner wrapping around the winding structure 111 once. With the metal foil 181, a principle face 181a constitutes the inner face of winding, while a principle face 181b constitutes the outer face of winding. The width of the metal foil 181 in the Z-axis direction is the same as the width of the negative-electrode collector 132 in the Z-axis direction, for example.

The lithium layer 183 functions as a lithium ion supply source when lithium ions are pre-doped into the negative-electrode active material layer 133. For this reason, preferably the lithium layer 183 is provided on the principle face 181a on the inner side of winding, instead of the principle face 181b on the outer side of winding. This way, during pre-doping, lithium ions diffuse from the principle face 181a of the metal foil 181 into the winding structure 111, through the electrolyte, without being shielded by the metal foil 181. It should be noted that, if the lithium layer 183 is provided on the principle face 181b, multiple through holes may be formed in the metal foil 181 to let lithium ions pass through the metal foil 181.

The separator 150a is placed between the lithium electrode 180 and the positive electrode 140. This way, the lithium electrode 180 is insulated from the positive electrode 140.

Also, in this embodiment, the lithium electrode 180 need not be placed in a manner surrounding the winding structure 111. For example, the lithium electrode 180 may be placed inside the winding structure 111, so long as the lithium electrode 180 is on the outer side of the negative-electrode terminal 131 and the positive-electrode terminal 141. In this case, the lithium electrode 180 is also connected to the negative electrode 130 electrically. When the electric storage element 110A described above is immersed in the electrolyte, lithium ions are pre-doped into the negative-electrode active material layer 133.

Specific examples of the material of the electric storage element 110A are explained.

The negative-electrode collector 132 may be a metal foil, for example. Multiple through holes may be provided on the metal foil. The negative-electrode collector 132 may be a copper foil, etc., for example. The negative electrode active material contained in the negative-electrode active material layer 133 is capable of occluding the lithium ions in the electrolyte, and may be non-graphitizing carbon (hard carbon), graphite, soft carbon, or other carbon material, for example. The negative-electrode active material layer 133 may be a mixture of the negative electrode active material and binder resin, and may further contain conductive agent. For example, the negative-electrode active material layer 133 is produced by coating a slurry mixture of any of the active materials mentioned above, conductive agent, and synthetic resin onto a base, forming it into a sheet, and then cutting the sheet.

The binder resin may be any synthetic resin that joins the negative electrode active material. The binder resin may be carboxymethyl cellulose, styrene butadiene rubber, polyethylene, polypropylene, polyethylene terephthalate, aromatic polyamide, fluororubber, polyvinylidene fluoride, isoprene rubber, butadiene rubber, ethylene propylene rubber, or the like, for example.

The conductive agent is constituted by grains made of conductive material, and any conductive agent may be used so long as it improves the conductivity within the negative electrode active material. Examples of the conductive agent include acetylene black, graphite, highly conductive carbon black, other carbon materials, and the like. Any one of the foregoing may be used alone, or two or more of them may be mixed together. It should be noted that the conductive agent may also be a metal material, conductive polymer, or other material so long as it exhibits conductivity.

The material of the positive-electrode collector 142 may be the same as, or different from, the material of the negative-electrode collector 132. As the positive electrode active material, the positive-electrode active material layer 143 contains at least one of active materials such as active carbon and PAS (Polyacenic Semiconductor). The positive-electrode active material layer 143 is produced by coating a slurry mixture of any of the active materials mentioned above, a conductive agent (such as highly conductive carbon black), and synthetic resin (such as PTFE) onto a base, forming it into a sheet, and then cutting the sheet. The material of the positive-electrode active material layer 143 may be the same as the material of the negative-electrode active material layer 133.

The separators 150 (the separators 150a and 150b) may each be a sheet material that lets electrolytic ions pass through the material but insulates the negative electrode 130 and the positive electrode 140. The separators 150 may be woven fabric, nonwoven fabric, microporous films of synthetic resin, etc. The separators 150 may be porous sheets made of glass fibers, cellulose fibers, plastic fibers, etc.

For the electrolyte, any desired composition can be selected. As cations, for example, the electrolyte may contain at least lithium ions, but tetraethyl ammonium ions, triethyl methyl ammonium ions, 5-azoniaspiro [4.4] nonane ions, ethyl methyl imidazolium ions, etc., may also be mixed in. As anions, the electrolyte may contain $BF_4^-$ (tetrafluoroborate ions), $PF_6^-$ (hexafluorophosphate ions), $(CF_3SO_2)_2N^-$ (TFSA ions), etc. As solvent, the electrolyte may contain propylene carbonate, ethylene carbonate, dimethyl carbonate, ethyl methyl carbonate, dimethyl carbonate, sulfolane, dimethyl sulfone, ethyl methyl sulfone, ethyl isopropyl sulfone, etc. To be specific, the electrolyte may be a propylene carbonate solution of lithium tetrafluoroborate ($LiBF_4$), lithium hexafluorophosphate ($LiPF_6$), or the like.

For the protective tapes 161 and 171, materials that are heat-resistant and also resistant to the electrolyte are applied. For example, the protective tapes 161 and 171 may contain any one of polyimide, polypropylene, polyphenylene sulfide, and the like.

[Operations of Electric Storage Element]

Before the operations of the electric storage element 110A pertaining to this embodiment are explained, the operations of the electric storage elements pertaining to comparative examples are explained. When the electric storage element becomes much smaller, the widths of the protective tapes must be decreased according to the degree of this size reduction; otherwise, the protective tapes become relatively wider in the electric storage element. An example of this is shown in FIGS. 5A and 5B.

Figure 5A:
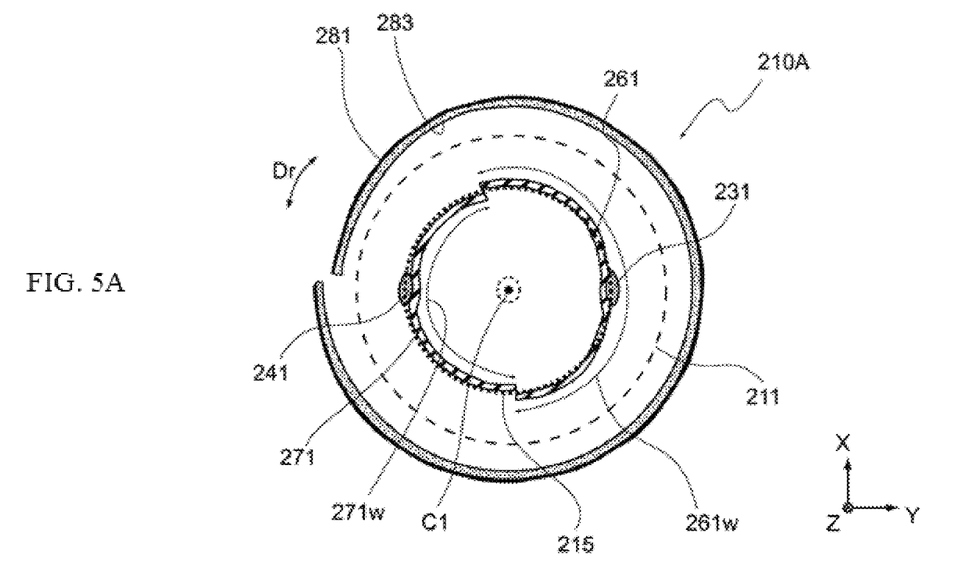
FIGS. 5A and 5B are schematic cross-sectional views showing the operations of the electric storage element 210A pertaining to a comparative example.
Figure 5B:
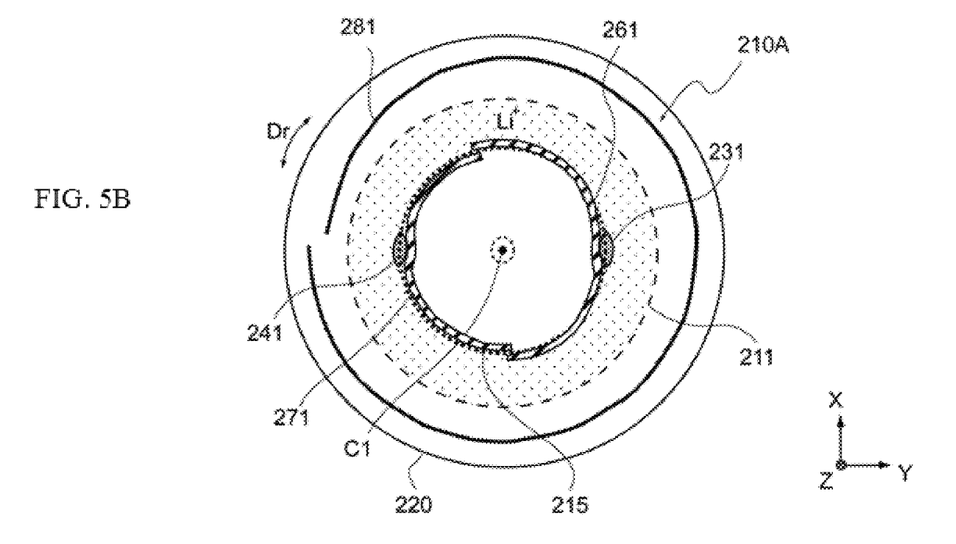

FIGS. 5A and 5B are schematic cross-sectional views showing the operations of an electric storage element 210A pertaining to a comparative example.

In FIGS. 5A and 5B, some parts of the electric storage element 210A are omitted to illustrate a simplified version of the electric storage element 210A, in order to clarify the positional relationships of protective tapes 261 and 271 and a lithium layer 283. FIG. 5A shows the electric storage element 210A in a state before lithium ions are pre-doped into an negative electrode, while FIG. 5B shows the electric storage element 210A in a state after the electric storage element 210A is immersed in the electrolyte inside a housing case 220, and lithium ions are doped into the negative electrode.

With the electric storage element 210A shown in FIG. 5A, the width corresponding to the sum of a width 261w of the protective tape 261 and a width 271w of the protective tape 271 is equal to or greater than the circumference of a circle 215 with a diameter D ((Width 261w+Width 271w)≥D×π). Such structure could be formed when the electric storage element becomes much smaller, but the widths of the protective tapes 261 and 271 are not adjusted according to this scale of size reduction. For example, the electric storage element becomes much smaller when the distance D is 8 mm or less, or the outer diameter of a winding structure 211 is 30 mm or less. In this case, the widths of the protective tapes 261 and 271 must be decreased according to the outer diameter R; otherwise, a constitution where the protective tapes 261 and 271 surround the circle 215 results, as is the case of the electric storage element 210A. It should be noted that, in the example of FIGS. 5A and 5B, the symbol "281" corresponds to a metal foil, the symbol "231" corresponds to a negative-electrode terminal, and the symbol "241" corresponds to a positive-electrode terminal.

As the electric storage element 210A is immersed in the electrolyte, lithium ions elute from the lithium layer 283 into the electrolyte, and those lithium ions are doped into the negative electrode of the electric storage element 210A. For example, the lithium ions diffuse from the lithium layer 283 toward the center axis of winding C1.

However, the protective tapes 261 and 271 exist between an outer periphery of the winding structure 211 and the center axis of winding C1. Furthermore, the width corresponding to the sum of the width 261w of the protective tape 261 and the width 271w of the protective tape 271 is equal to or greater than the circumference of the circle 215. In other words, the winding structure 211 is configured such that the area inside the circle 215 is demarcated by the protective tapes 261 and 271.

The result of this is that with the electric storage element 210A, lithium ions are shielded by the protective tapes 261 and 271 at the time of lithium ion pre-doping, and consequently lithium ions do not spread fully inside the circle 215. For example, FIG. 5B provides a schematic representation of the lithium ions that have been doped into the winding structure 211, as dots. FIG. 5B shows that the lithium ion concentration is relatively higher on the outer side of the protective tapes 261 and 271.

Figure 6A:
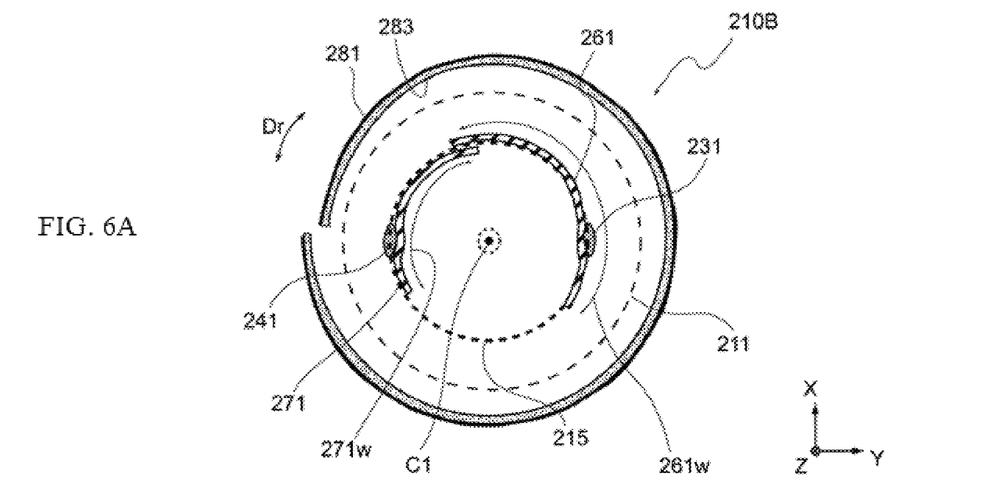
FIGS. 6A and 6B are schematic cross-sectional views showing the operations of the electric storage element 210B pertaining to another comparative example.
Figure 6B:
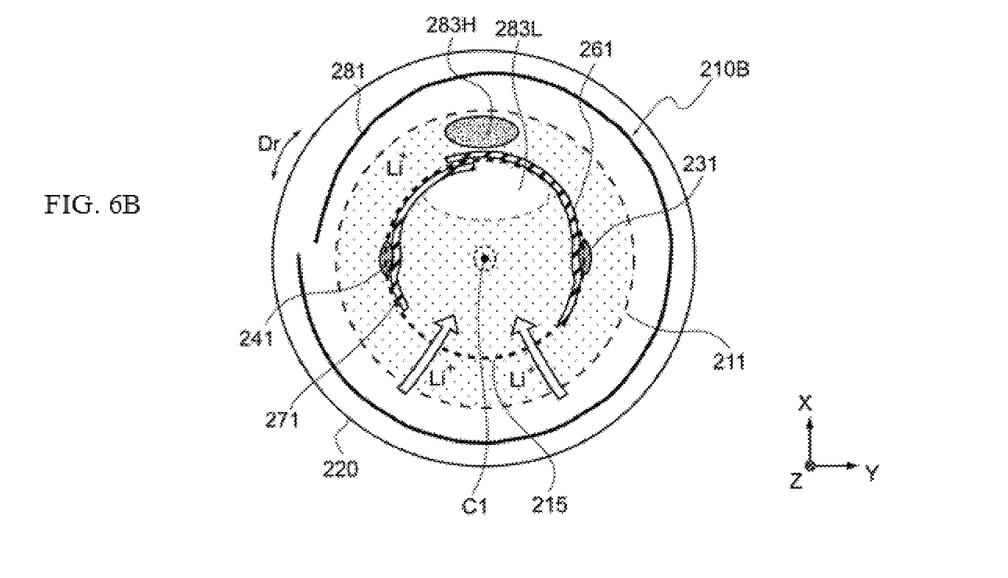

Also, FIGS. 6A and 6B are schematic cross-sectional views showing the operations of an electric storage element 210B pertaining to another comparative example.

FIG. 6A shows a state before lithium ions are pre-doped into a negative electrode, while FIG. 6B shows a state after lithium ions are pre-doped into the negative electrode.

With the electric storage element 210B shown in FIG. 6A, the width corresponding to the sum of the width 261w of the protective tape 261 and the width 271w of the protective tape 271 is smaller than the circumference of the circle 215 with the diameter D. With the electric storage element 210B, however, a part of the protective tape 261 is overlapping a part of the protective tape 271. Such constitution could also be formed when the electric storage element 210B becomes much smaller, but the widths of the protective tapes 261 and 271 are not adjusted according to this scale of size reduction.

With the electric storage element 210B, lithium ions enter the circle 215 from the non-overlapping parts of the protective tapes 261 and 271 at the time of pre-doping, for example (FIG. 6B). However, the lithium ions are shielded by the overlapping parts of the protective tapes 261 and 271, and consequently do not spread uniformly into the circle 215. For example, an area with high lithium ion concentration 283H may be formed locally on the outer side of the protective tapes 261 and 271. Or, an area with low lithium ion concentration 283L may be formed locally on the inner side of the protective tapes 261 and 271.

As described above, lithium ions may not be uniformly doped into the negative electrode, in the case of the electric storage elements 210A and 210B pertaining to the comparative examples.

Figure 7A:
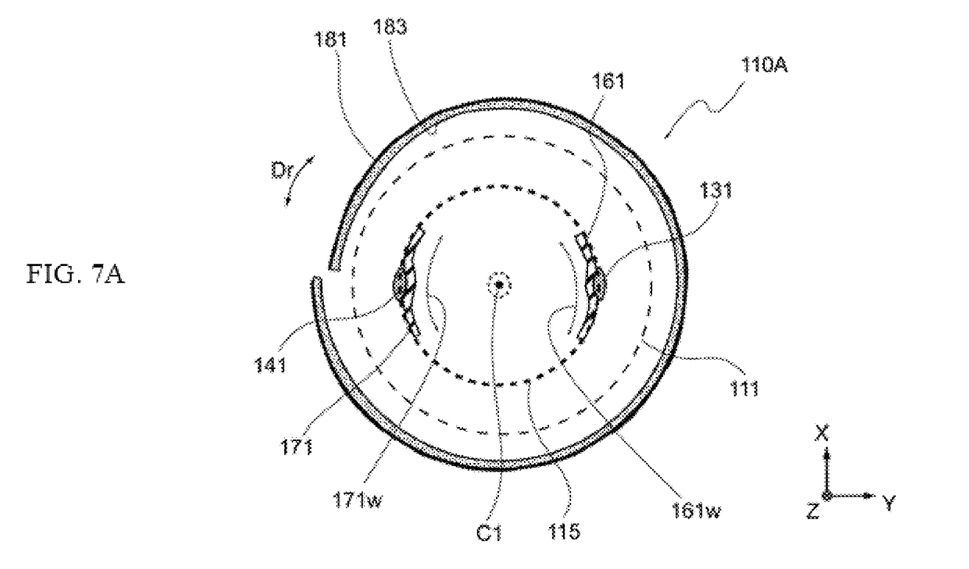
FIGS. 7A and 7B are schematic cross-sectional views showing the operations of the electric storage element 110A pertaining to this embodiment.
Figure 7B:
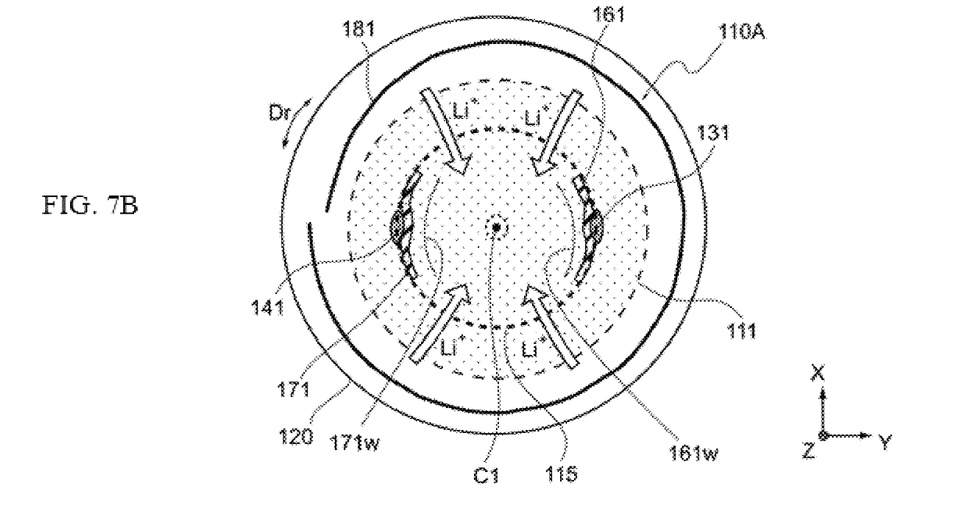

On the other hand, FIGS. 7A and 7B are schematic cross-sectional views showing the operations of the electric storage element 110A pertaining to this embodiment.

FIG. 7A shows a state before lithium ions are pre-doped into the negative electrode 130, while FIG. 7B shows a state after lithium ions are pre-doped into the negative electrode 130.

With the electric storage element 110A, the width corresponding to the sum of the width 161w of the protective tape 161 and the width 171w of the protective tape 171 is smaller than the circumference of a circle 115 with diameter D ((Width 161w+Width 171w)<D×π). Furthermore, the protective tape 161 does not overlap the protective tape 171 in the direction from the center axis of winding C1 toward the outer periphery of the winding structure 111.

Such structure makes lithium ions less likely to be shielded by the protective tapes 161 and 171 at the time of lithium ion pre-doping. For example, the electric storage element 110A has two gaps between the protective tapes 161 and 171, while the electric storage element 210B has one such gap. Furthermore, when the protective tape 161, the center axis of winding C1, and the protective tape 171 are lined up, these two gaps are positioned in a point-symmetric manner with respect to the center axis of winding C1. This way, lithium ions can more uniformly diffuse inside and outside the circle 115 (FIG. 7B). The result is that, with the electric storage element 110A, lithium ions are more uniformly doped into the negative electrode 130.

As described above, the electric storage element 110A is structured in such a way that Expression (1) above is satisfied, and the protective tapes 161 and 171 do not overlap each other, even when the distance D is 8 mm or less, or the outer diameter of the winding structure 111 is 30 mm or less. With such structure, lithium ions are more uniformly doped into the negative electrode 130.

[Variation Example of Electrochemical Device]

Figure 8:
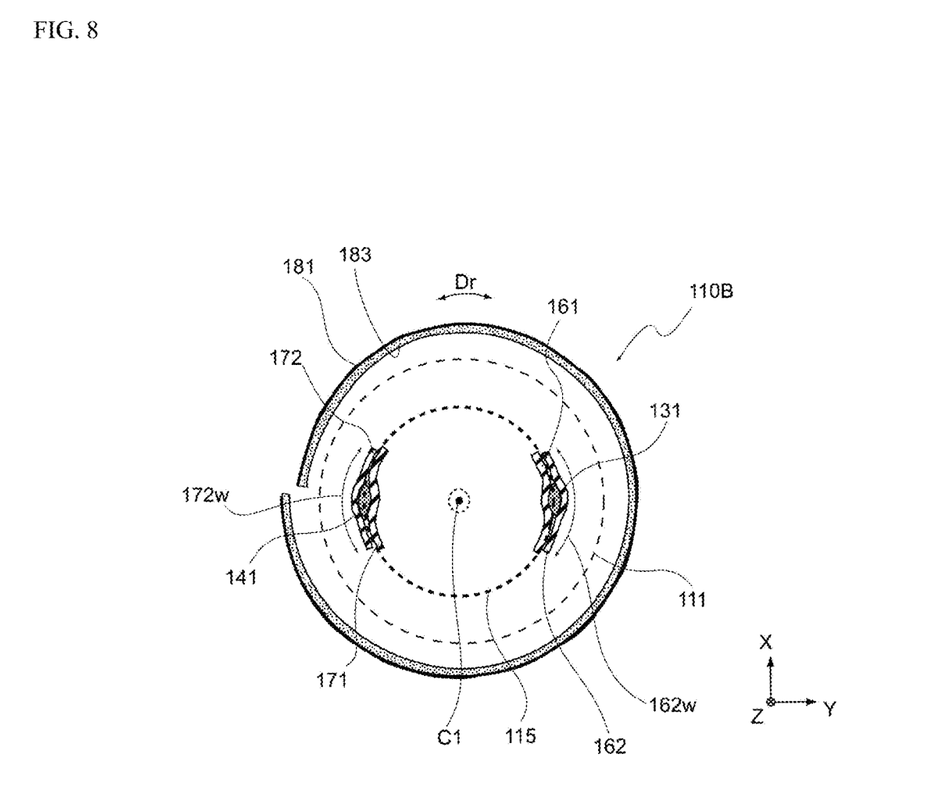
FIG. 8 is a schematic cross-sectional view showing the electric storage element 110B pertaining to a variation example of this embodiment.

FIG. 8 is a schematic cross-sectional view showing an electric storage element 110B pertaining to a variation example of this embodiment.

The electric storage element 110B shown in FIG. 8 further has a protective tape 162 and a protective tape 172.

The negative-electrode terminal 131 is covered by the protective tape 162 from the opposite side of the center axis of winding C1.

The protective tape 162 faces the protective tape 161 across the negative-electrode terminal 131 and the negative-electrode collector 132. The protective tape 161 is positioned between the protective tape 162 and the center axis of winding C1. The protective tape 162 has a width 162w in the winding direction Dr. Furthermore, the protective tape 162 does not overlap the protective tape 172 in the direction from the center axis of winding C1 toward the outer periphery of the winding structure 111. Also, the protective tape 172, the winding core 112 (the center axis of winding C1), and the protective tape 162 are arranged in this order along a single line.

For example, the negative-electrode terminal 131 may be joined to the negative-electrode collector 132 by means of needle-clinching, and a needle member may pierce through the reverse side of the negative-electrode collector 132 and also through the negative-electrode active material layer 133 provided on the reverse side of the negative-electrode collector 132. Should this happen, the projecting part of the needle member is covered with the protective tape 162, so that lithium deposition onto the projecting needle member can be suppressed. Also, the protective tape 162 prevents the projecting needle member from contacting the adjacent separator. Or, if the needle member breaks through the separator, the protective tape 162 prevents the needle member from directly contacting the positive-electrode active material layer 143.

Also, the positive-electrode terminal 141 is covered by the protective tape 172 from the opposite side of the center axis of winding C1. The protective tape 172 faces the protective tape 171 across the positive-electrode terminal 141 and the positive-electrode collector 142. The protective tape 171 is positioned between the protective tape 172 and the center axis of winding C1. The protective tape 172 has a width 172$w$ in the winding direction Dr. In the example of FIG. 8, the width 162$w$ is the same as the width 172$w$. It should be noted that the protective tape 172, the winding core 112 (the center axis of winding C1), and the protective tape 162 need not be arranged along a single line. Furthermore, the width 162$w$ may be different from the width 172$w$.

For example, the positive-electrode terminal 141 may be joined to the positive-electrode collector 142 by means of needle clinching, and a needle member may pierce through the reverse side of the positive-electrode collector 142 and also through the positive-electrode active material layer 143 provided on the reverse side of the positive-electrode collector 142. Should this happen, the projecting part of the needle member is covered with the protective tape 172, so that direct contact of the projecting needle member with the adjacent negative-electrode active material layer 133 can be avoided.

Furthermore, the width corresponding to the sum of the width 162$w$ of the protective tape 162 and the width 172$w$ of the protective tape 172 is smaller than the value obtained by multiplying the distance D by pi $\pi$ ((Width 162$w$+Width 172$w$)<D×$\pi$ - - - (2)). The widths 162$w$ and 172$w$ are each variable. However, the widths 162$w$ and 172$w$ satisfy the relationship of Expression (2) above. The width 162$w$ equals X % of the value of (D×$\pi$) (X≥12.0). The width 172$w$ is smaller than (100−X)%.

According to such structure, or specifically the structure whereby Expression (2) above is satisfied, and the protective tapes 162 and 172 do not overlap each other, even when the distance D is 8 mm or less, or the outer diameter of the winding structure 111 is 30 mm or less, lithium ions are more uniformly doped into the negative electrode 130.

The foregoing explains an embodiment of the present invention; needless to say, however, the present invention is not limited to the aforementioned embodiment, and various changes may be added.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-204447, filed Oct. 18, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:
1. An electrochemical device, comprising:
a winding structure having;
   a negative electrode having a negative-electrode collector, and a negative-electrode active material layer provided on a principle face of the negative-electrode collector;
   a positive electrode having a positive-electrode collector, and a positive-electrode active material layer provided on a principle face of the positive-electrode collector; and
   separators insulating the negative electrode and the positive electrode;
wherein, the negative electrode, the positive electrode, and the separators are stacked and wound together, with the negative electrode and the positive electrode separated by the separators;
a negative-electrode terminal which is electrically connected to the negative-electrode collector, extends in the winding structure along a center axis of winding of the winding structure, and projects from the winding structure;
a positive-electrode terminal which is electrically connected to the positive-electrode collector, extends in the winding structure along the center axis of winding, projects from the winding structure, and is separated from the negative-electrode terminal by a first distance which is defined as a distance in a straight line between a center of the positive-electrode terminal and a center of the negative-electrode terminal;
a first protective tape covering the negative-electrode terminal and the negative-electrode active material layer;
a second protective tape covering the positive-electrode terminal and the positive-electrode active material layer;
a lithium ion supply source being placed along a winding direction of the winding structure solely at a position further away from the central axis than are positions of the negative-electrode terminal and the positive-electrode terminal as viewed in a direction of the central axis, said lithium ion supply source being sole lithium ion supply source contained in the electrochemical device; and electrolyte immersing the positive electrode, the negative electrode, the lithium ion supply source, and the separators;

wherein, a width corresponding to the sum of a first width (W1) of the first protective tape along a winding direction of the winding structure, and a second width (W2) of the second protective tape along the winding direction, is smaller than a value obtained by multiplying the first distance (D) by pi ($\pi$).

2. The electrochemical device according to claim 1, wherein the electrochemical device is characterized in that lithium ions are pre-doped into the negative-electrode active material layer.

3. The electrochemical device according to claim 1, wherein the electrochemical device is characterized in that the first protective tape does not overlap the second protective tape in the direction from the center axis of winding toward an outer periphery of the winding structure.

4. The electrochemical device according to claim 2, wherein the electrochemical device is characterized in that the first protective tape does not overlap the second protective tape in the direction from the center axis of winding toward an outer periphery of the winding structure.

5. The electrochemical device according to claim 1, wherein the electrochemical device is characterized in that the first distance is 8 mm or less.

6. The electrochemical device according to claim 2, wherein the electrochemical device is characterized in that the first distance is 8 mm or less.

7. The electrochemical device according to claim 3, wherein the electrochemical device is characterized in that the first distance is 8 mm or less.

8. The electrochemical device according to claim 1, wherein the electrochemical device is characterized that an outer diameter of the winding structure is 30 mm or less.

9. The electrochemical device according to claim 2, wherein the electrochemical device is characterized that an outer diameter of the winding structure is 30 mm or less.

10. The electrochemical device according to claim 3, wherein the electrochemical device is characterized that an outer diameter of the winding structure is 30 mm or less.

11. The electrochemical device according to claim 1, wherein the first width (W1) is equal to or more than 12% of the aforementioned value (D·$\pi$), wherein (W1+W2)<D·$\pi$.

12. The electrochemical device according to claim 2, wherein the first width (W1) is equal to or more than 12% of the aforementioned value (D·$\pi$), wherein (W1+W2)<D·$\pi$.

13. The electrochemical device according to claim 3, wherein the first width (W1) is equal to or more than 12% of the aforementioned value (D·$\pi$), wherein (W1+W2)<D·$\pi$.

14. The electrochemical device according to claim 1, wherein the lithium ion supply source is placed on an all-around outermost side of the winding structure as viewed in a direction of the center axis.

\* \* \* \* \*